(12) United States Patent
Naber (10) Patent No.: US 11,454,166 B2
(45) Date of Patent: Sep. 27, 2022

(54) COMBUSTION PRESSURE DETECTION FOR A HYBRID OPPOSED PISTON ENGINE

(71) Applicant: Pinnacle Engines, Inc., San Carlos, CA (US)

(72) Inventor: Clayton Naber, San Mateo, CA (US)

(73) Assignee: Pinnacle Engines, Inc., San Carlos, CA (US)

(*) Notice: Subject to any disclaimer, the term of this patent is extended or adjusted under 35 U.S.C. 154(b) by 0 days.

(21) Appl. No.: 17/370,518

(22) Filed: Jul. 8, 2021

(65) Prior Publication Data

US 2022/0010725 A1 Jan. 13, 2022

Related U.S. Application Data

(60) Provisional application No. 63/049,634, filed on Jul. 9, 2020.

(51) Int. Cl.
| | | |
|---|---|---|
| *F02B 75/28* | (2006.01) | |
| *F01B 7/14* | (2006.01) | |
| *F02D 35/02* | (2006.01) | |
| *F02B 25/08* | (2006.01) | |
| *F02D 41/00* | (2006.01) | |

(52) U.S. Cl.
CPC ............ *F02B 75/282* (2013.01); *F01B 7/14* (2013.01); *F02B 25/08* (2013.01); *F02D 35/028* (2013.01); *F02D 41/009* (2013.01); *F02D 2200/10* (2013.01); *F02D 2400/04* (2013.01)

(58) Field of Classification Search
CPC .. F02D 2400/04; F02D 41/009; F02B 75/282; F02B 25/08; F01B 7/14
See application file for complete search history.

(56) References Cited

U.S. PATENT DOCUMENTS

| | | | |
|---|---|---|---|
| 7,058,487 B2 * | 6/2006 | Hara | B60W 20/15 701/1 |
| 11,242,809 B2 * | 2/2022 | Ghazi | F02D 9/04 |
| 2002/0068999 A1 | 6/2002 | Kotre et al. | |
| 2004/0093867 A1 * | 5/2004 | Masuda | F02D 23/02 60/608 |
| 2005/0038576 A1 | 2/2005 | Hara et al. | |
| 2018/0087459 A1 * | 3/2018 | Hagari | F02D 35/023 |
| 2019/0264624 A1 | 8/2019 | Hagari | |
| 2020/0132110 A1 | 4/2020 | Naber | |

OTHER PUBLICATIONS

International Search Report of the corresponding International Patent Application (PCT/US2021/040854), dated Oct. 2021.

\* cited by examiner

*Primary Examiner* — Kevin A Lathers
(74) *Attorney, Agent, or Firm* — Platinum Intellectual Property LLP (57) ABSTRACT

An engine unit controller (EUC) in connection with a hybrid opposed piston engine can receive real-time movement data of a crankshaft via a crank position sensor. It can simultaneously receive current data of an electric motor that partially controls the crankshaft. With the known engine constants, the EUC can determine instantaneous combustion pressure data based on the movement data and the current data. Such combustion pressure data can be used to optimize the engine's performance in real-time.

20 Claims, 8 Drawing Sheets

FIG. 7 ant_id="1"># COMBUSTION PRESSURE DETECTION FOR A HYBRID OPPOSED PISTON ENGINE

CROSS-REFERENCE TO RELATED APPLICATION

This application claims priority to U.S. Provisional Application No. 63/049,634, entitled "COMBUSTION PRESSURE DETECTION FOR A HYBRID OPPOSED PISTON ENGINE" filed on Jul. 9, 2020, the content of which is expressly incorporated by reference herein in its entirety.

TECHNICAL FIELD

The disclosure generally relates to a system and method for obtaining the internal combustion pressure of a hybrid engine.

BACKGROUND

An internal combustion engine has at least one piston within a cylinder. As one type of the internal combustion engine, an opposed piston engine has two reciprocating pistons at both ends of the cylinder. A hybrid engine combines an internal combustion engine with an electric motor. The common goals of any engine include maximizing power output, minimizing energy consumption and reducing pollutants formed during the combustion process. Fluctuation in combustion pressures often hampers these goals as the pressure fluctuations are inevitable and difficult to control.

SUMMARY

In some implementations, a controller unit of a hybrid opposed piston engine is configured to receive movement data associated with a crankshaft via a sensor. The controller unit can simultaneously receive current data associated with a motor current of the electric motor. After retrieving known engine constants from a memory of the controller unit, the controller unit can determine instantaneous combustion pressure data based on the engine constants, the movement data and the current data.

According to some embodiments, the movement data and the current data are continuously received over a cycle of the engine, and the combustion pressure data is continuously determined over a cycle of the hybrid engine.

According to some embodiments, the electric motor can be any auxiliary torque supplier that contributes to the movement of a crankshaft assembly. Accordingly, a controller unit can receive movement data associated with the crankshaft assembly and the auxiliary torque data related to the auxiliary torque supplier. With the known relevant engine constants, controller unit can determine the combustion pressure data based on the movement data and the auxiliary torque data.

According to some embodiments, the controller unit can further determine a combustion phasing or spark timing based on the combustion pressure data. It can further optimize a combustion timing based on the determined combustion phasing. The optimized combustion timing can improve the efficiency of the hybrid combustion engine.

According to some embodiments, the controller unit can, based on the combustion pressure data, further determine a target crank angular acceleration that maximizes the efficiency of the hybrid combustion engine. Based on the combustion pressure data and the determined target crank angular acceleration, the controller unit can determine a target motor current to maximize the engine's efficiency. At last, the controller unit can adjust the motor current to the target motor current.

According to some embodiments, a controller unit of a hybrid HCCI engine is configured to receive movement data associated with a crankshaft via a sensor. The controller unit can simultaneously receive current data associated with a motor current of the electric motor. After retrieving known engine constants from a memory of the controller unit, the controller unit can determine instantaneous combustion pressure data based on the engine constants, the movement data and the current data. Furthermore, the controller unit can determine, based on the combustion pressure data, one or more target engine operating parameters to maximize the efficiency of the hybrid HCCI engine. As a result, the controller unit can adjust one or more engine operating parameters to implement these changes.

The electric motor of the hybrid opposed piston engine can be a motor and/or generator, such as an induction motor, a piezoelectric motor, and any combination thereof. The electric motor can eliminate frictional losses, thus increasing the net thermodynamic efficiency of the system. The hybrid opposed piston engine can comprise a battery cell comprising of numerous interrelated electric cells for storing energy generated by the electric component as a generator.

Further, the hybrid opposed piston engine may achieve improved thermodynamic efficiency by dynamically manipulating the combustion volume in the cylinder through instantaneous electronic control of the position of one or both of the opposed pistons. By adding combustion volume as an additional degree of freedom with which to manage combustion temperature, NOx emissions can be reduced and thermodynamic efficiency can be improved.

According to some embodiments, the method and system of the present subject matter can be a single-cylinder hybrid engine or a multi-cylinder hybrid engine. Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings and in which.

DETAILED DESCRIPTION

The present subject matter pertains to improved approaches to obtain the internal pressure of a hybrid internal combustion engine. Embodiments of the present subject matter are discussed below with reference to FIGS. 1-7.

In the following description, for purposes of explanation, numerous specific details are set forth in order to provide a thorough understanding of the present subject matter. It will be apparent, however, to a person skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

Various embodiments of the present subject matter are discussed in detail below. While specific implementations are discussed, it should be understood that this is done for illustration purposes only. A person skilled in the relevant art will recognize that other components and configurations may be used without departing from the spirit and scope of the present subject matter.

To reduce the undesired fluctuations in combustion pressure, an engine controller unit (ECU) can provide calibrations to compensate for some fluctuations. Such combustion pressure fluctuation causes increased exhaust emissions, reduced power efficiency and even reduce engine durability. Engineers usually compensate for these fluctuations with less-than-optimal parameter settings in the ECU so that, over the life of the engine, it maintains acceptable emissions and durability.

It is highly useful to have a real-time detection of the combustion pressure during an engine's combustion cycle. With a real-time detection and understanding of the combustion pressure, the ECU can respond accordingly and instantaneously to the unexpected fluctuations in combustion, e.g., by adjusting the controller settings so that the engine can regain the lost efficiency, reduce its pollutant emissions and reduce engine damages.

Traditional methods of detecting a real-time combustion pressure include installing an in-cylinder pressure detector that can detector the combustion pressure directly. However, such an in-cylinder pressure detector is expensive to implement. Secondly, the sensor's reliability reduces over time because it is directly exposed to the high pressure and temperature of the combustion chamber. Although it is possible to detect the combustion pressure in a lab-controlled environment, such an in-lab approach is difficult to reproduce in a commercial setting.

Therefore, there is an unmet need for detecting real-time combustion pressure in an engine's combustion cycle in connection with an electric motor.

Figure 1A:
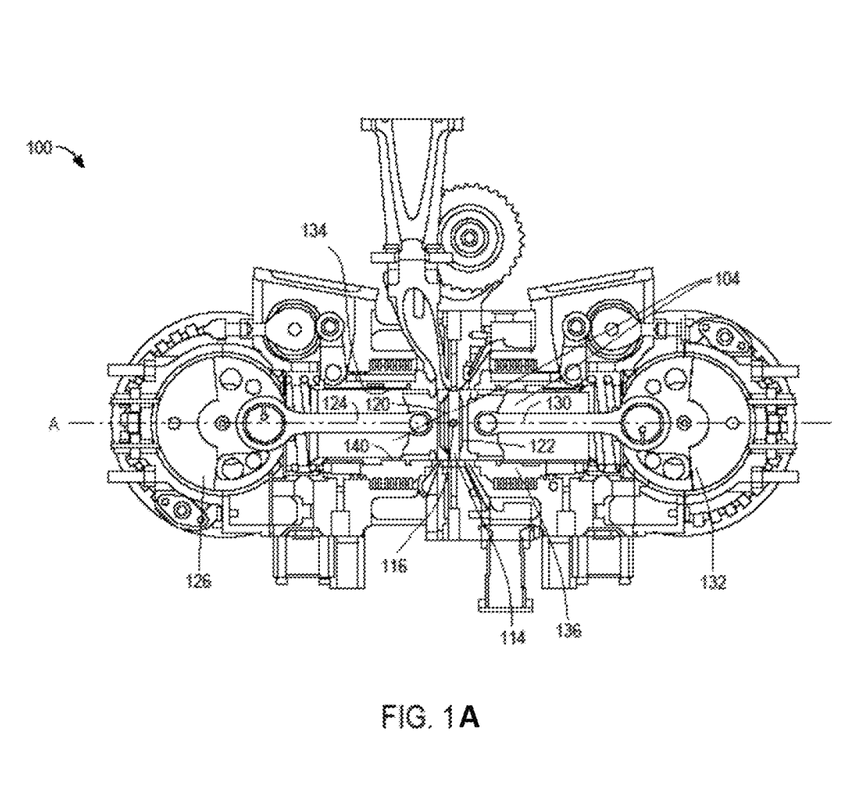
FIGS. 1A and 1B are examples of hybrid opposed piston engines according to some embodiments.
Figure 1B:
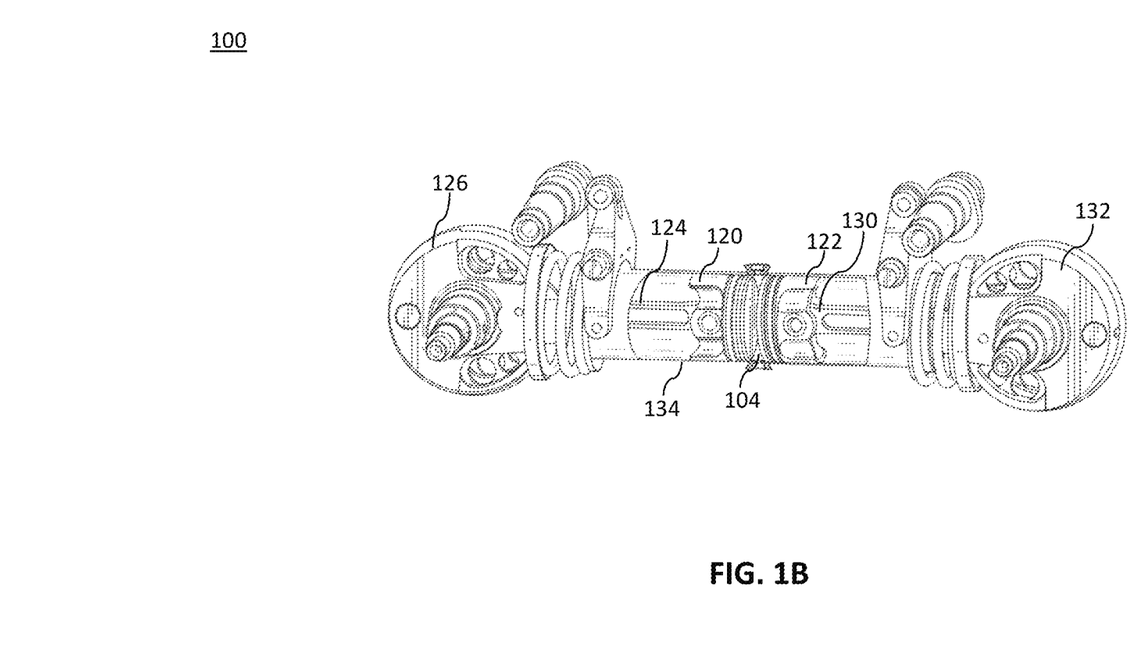

FIGS. 1A and 1B are examples of hybrid opposed piston engine 100 according to some embodiments. FIG. 1A illustrates an opposed piston engine 100 that includes two pistons that share a common cylinder and form a combustion volume defined by the pistons and the walls of the cylinder. FIG. 1B is another exemplary view of hybrid opposed piston engine 100 as shown in FIG. 1A. Other engine configurations, such as for example those in which each piston is disposed in a separate cylinder whose combustion volume is formed by the piston, a cylinder head, and the walls of the cylinder, are also within the scope of the current subject matter.

As shown in FIGS. 1A and 1B, opposed piston engine 100 is configured such that left piston 120 and right piston 122 reciprocate within cylinder 104 along a centerline A of cylinder 104. Left piston 120 is connected to left connecting rod 124, which in turn connects to left crankshaft 126. Right piston 122 is connected to right connecting rod 130, which in turn connects to right crankshaft 132. Left piston 120 reciprocates within cylinder 104, and is slidably movable to the left and right along cylinder wall 134. Right piston 122 also reciprocates within cylinder 104, and is slidably movable to the left and right along cylinder wall 134.

FIG. 1A also illustrates sleeve valve body 140 that can be slidably movable to the left and right (from the FIG. 1 perspective), such as relative to an oil-path defining piece 136. Left piston 120 and right piston 122 are disposed in cylinder 104 as they would be at Top Dead Center (TDC), with the combustion volume, which is defined by cylinder wall 134, valve seat 114, and piston heads 116 of left piston 120 and right piston 122, at its smallest. An engine can be configured such that the ignition timing occurs either at, before, or after the minimum combustion volume.

According to some embodiments, opposed piston engine 100 can comprise multiple cylinders, each of which forms a combustion volume defined by the pistons and the walls of the cylinder. Furthermore, one or more electric motors (not shown) can be coupled to opposed piston engine 100. Opposed piston engine 100 can comprise one or more battery cells (not shown) comprising of numerous interrelated electric cells for storing energy generated by the electric motor as a generator.

Figure 2:
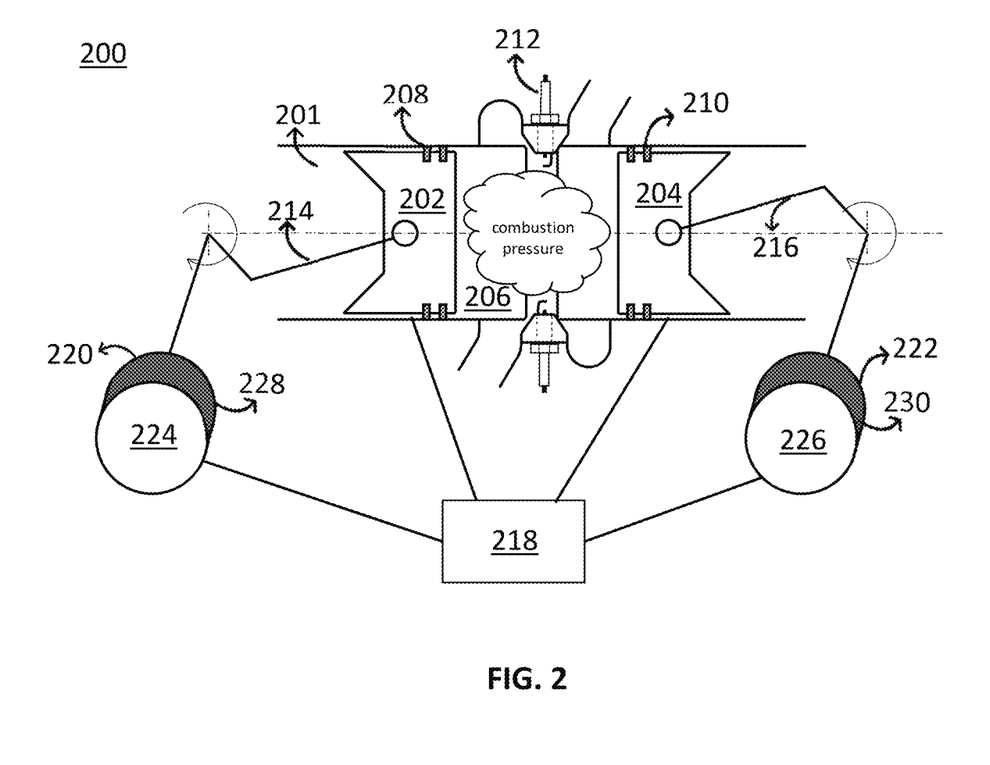
FIG. 2 illustrates an embodiment of a hybrid opposed piston engine according to some embodiments.

FIG. 2 illustrates hybrid opposed piston engine 200 according to some embodiments of the present subject matter. According to some embodiments, hybrid opposed piston engine 200 includes an opposed piston engine 201 and at least one electric motor, e.g., first electric motor 224, configured to jointly control at least one crankshaft assembly, e.g., first crankshaft assembly 220. According to some embodiments, second electric motor 226 can jointly control second crankshaft assembly 222.

The electric motor, e.g., first electric motor 224 or second electric motor 226, of the hybrid opposed piston engine can be a motor and/or generator (or "motor-generator"), such as a battery motor, a brushless DC motor, a brushed DC motor, an induction motor, a piezoelectric motor, and the like or any combination thereof. The electric motor can eliminate frictional losses, thus increasing the net thermodynamic efficiency of the system. The hybrid opposed piston engine can comprise a battery cell (not shown) comprising of numerous interrelated electric cells for storing energy generated by the electric component as a generator.

In this example, first electric motor 224 or second electric motor 226 can comprise an electric motor and/or generator. When it functions as a motor, the electric motor can control first piston 202 or second piston 204 to optimize the power output and efficiency of fuel. When it functions as a generator, the electric motor can recover the energy generated by deceleration/braking to recharge the battery. Thus, the electric motor can eliminate frictional losses, thus increasing the net thermodynamic efficiency of the system.

Hybrid opposed piston engine 200 can comprise a battery comprising of numerous interrelated electric cells for storing energy generated by the electric motor as a generator and providing energy to control the pistons' position and movement by the electric component as an electric motor. According to some embodiments, hybrid opposed piston engine 200 can comprise a motor control module configured to control the operation of first electric motor 224 or second electric motor 226. According to some embodiments, hybrid opposed piston engine 200 can comprise a battery control module to monitor the physical variables of the battery.

According to some embodiments, a controller unit 218 is configured to communicate with and adjust numerous actuators of the hybrid opposed piston engine 200. An example of the controller unit 218 is an engine control unit (ECU) or any computing device that is part of the engine management system. The controller unit 218 can receive data input from a number of sensors, e.g., a first sensor 228 or a second sensor 230, and accordingly change the engine actuators by adjusting the controller settings, such as adjusting the fuel injection or ignition timing. An example of the first sensor 218 or the second sensor 230 is a shaft speed sensor or angular position encoder or any crank position sensor that can be configured to determine the position and/or rotational speed (RPM) of the crank.

As seen in FIG. 2, hybrid opposed piston engine 200 comprises first piston 202 that drives first crankshaft assembly 220 via first connecting rod 214 and second piston 204 that drives second crankshaft assembly 222 via second connecting rod 216. Slidably disposed first piston 202 and second piston 204 can form combustion chamber 206 between them.

According to some embodiments, first sleeve valve 208 is disposed between first piston 202 and the cylinder wall of opposed piston engine 201. First sleeve valve 208 can be configured to enable the air-fuel mixture to enter combustion chamber 206 during the induction stroke and allow the exhaust gas to exit it during the exhaust stroke. According to some embodiments, additional inlet valves and exhaust valves can be adopted in the opposed piston engine 201. Furthermore, second sleeve valve 210 can be similarly placed between second piston 204 and the cylinder wall.

When the air-fuel mixture is inducted and compressed into the combustion chamber 206 via first sleeve valve 208 and second sleeve valve 210, spark plug 212 ignites the compressed mixture near the TDC (Top Dead Center) in the chamber. The combustion creates combustion pressure P that provides the piston gas torque Tg to power the reciprocating movement of first piston 202 and second piston 204, thus at least partially drive first crankshaft assembly 220 and second crankshaft assembly 222.

Further, hybrid opposed piston engine 200 may achieve improved thermodynamic efficiency by dynamically manipulating the combustion volume in the cylinder through instantaneous electronic control of the position of one or both of the opposed pistons. By adding combustion volume as an additional degree of freedom with which to manage combustion temperature, NOx emissions can be reduced, and thermodynamic efficiency can be improved.

For example, thermodynamic efficiency may be increased at low engine power output levels through continuously variable piston displacement. The travel of the opposed pistons can be controlled (e.g., via electrical components and control system), allowing the piston displacement of one or both of the opposed pistons to be adjusted to an optimal setting for a given engine power output level without changing the compression ratio. Implementations of the current subject matter may be applicable to single-cylinder or low cylinder count engines (e.g., two and/or three cylinders).

Figure 3:
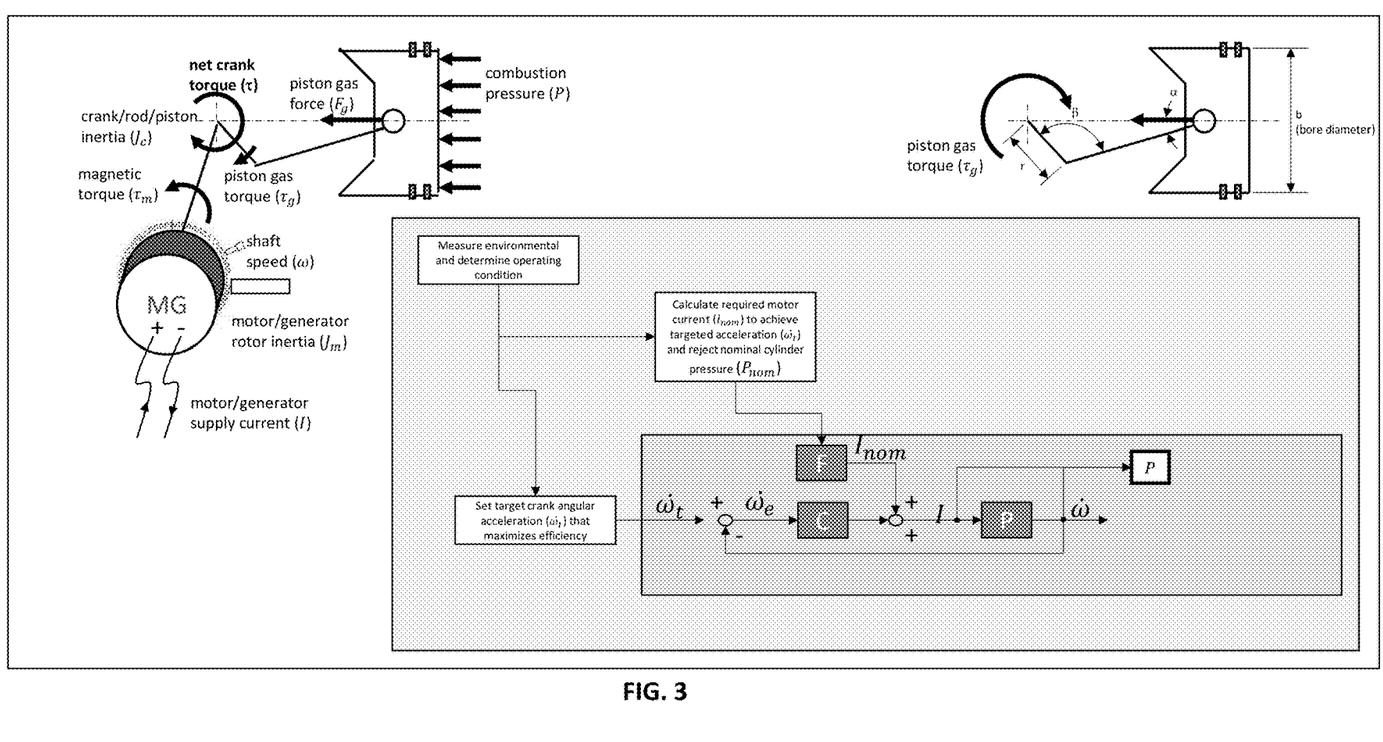
FIG. 3 illustrates a method for measuring a combustion pressure according to some embodiments.

In connection with FIG. 2, FIG. 3 illustrates a method for measuring a combustion pressure according to some embodiments. As shown in FIG. 3, it is known that the piston gas torque $T_g$ is determined by the combustion pressure P in conjunction with other known piston geometry parameters such as the bore diameter b, crank through r, crank angle β, position of piston pin from crank center α. It is also known that the motor torque $T_m$ generated by first electric motor 224 is proportional to the supply current I according to the constant of proportionality $K_t$.

Furthermore, the instantaneous speed of the crankshaft, e.g., crank angular acceleration $\dot{\omega}_r$, is determined by the total torque T applying to the crankshaft and the total inertia J of all components, wherein T is the combination of $T_g$ and $T_m$ and J is the combination of crank/rod/piston inertia $J_c$ and motor inertia $J_m$. It is known that the total torque $T=J\dot{\omega}$ is known a-priori from feed-forward control algorithm, and is measured by either a shaft speed sensor or angular position encoder. For example, a change of the crankshaft speed $\dot{\omega}_r$ is solely caused by the total amount of torque being applied as the total inertia that remains constant.

Thus, combustion pressure P can be a function of electric current I supplied to the motor/generator, fixed geometric, and intrinsic constants that describe the engine and e-motor. Knowing the relevant engine constants such as J, $K_t$, b, r, engine controller 218, by receiving real-time, instantaneous data related to the supply current I and the crank movement, can calculate the instantaneous combustion pressure P based on the following formula:

$$P = (J\dot{\omega} - K_t I)\frac{4\cos\alpha}{\pi b^2 r \sin\beta}$$

Furthermore, referring to FIG. 2, when continuously collects the supply current data and crank movement data over a cycle of the hybrid opposed engine, controller unit 218 can determine the continuous combustion pressure data over a cycle of the engine. According to some embodiments, the continuous combustion pressure data over a cycle can be used to calculate the mean effective pressure (IMEP) of hybrid opposed piston engine 200.

According to some embodiments, first electric motor 224 can be any auxiliary torque supplier that contributes to the movement of the crankshaft assembly. Accordingly, engine controller 218 can receive movement data associated with a crankshaft assembly via a sensor and collect the auxiliary torque data related to the auxiliary torque supplier. With the known relevant engine constants, engine controller 218 can determine the combustion pressure data based on the movement data and the auxiliary torque data.

Figure 4:
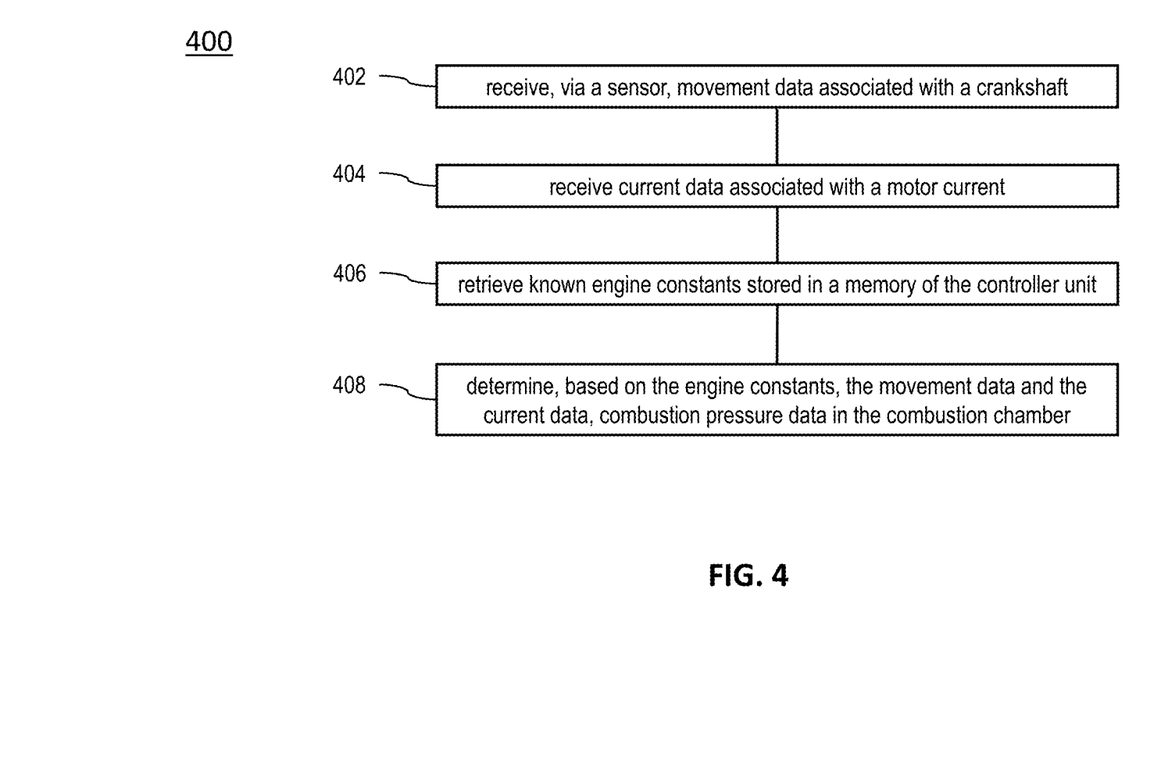
FIG. 4 is an example flow diagram illustrating one embodiment of the present subject matter.

FIG. 4 is an example flow diagram 400 illustrating one embodiment of the present subject matter. According to some embodiments, at step 402, a controller unit of a hybrid combustion engine is configured to receive movement data associated with a crankshaft via a sensor. An example of the controller unit can be an ECU or any computing device that is part of the engine management system. An example of the sensor is a shaft speed sensor or angular position encoder or any crank position sensor that are configured to determine the movement data such as position and/or rotational speed of the crank.

At step 404, the controller unit can simultaneously receive current data associated with a motor current of the electric motor. An electric motor can be a battery motor, a brushless DC motor, a brushed DC motor, or an AC induction motor. According to some embodiments, the current data can be the supply current I of the electric motor.

At step 406, the controller unit can retrieve known engine constants from a memory of the controller unit. Examples of the engine constants include, for example, the bore diameter b, crank through r, crank angle $\beta$, the position of piston pin from crank center $\alpha$, the constant of proportionality $K_t$, etc.

At step 408, the controller unit can determine instantaneous combustion pressure data based on the engine constants, the movement data, and the current data based on a proposed formula as described herein.

According to some embodiments, the movement data and the current data are continuously received over a cycle of the engine, and the combustion pressure data is continuously determined over a cycle of the hybrid engine. According to some embodiments, the continuous combustion pressure data over a cycle can be used to calculate the mean effective pressure (IMEP) of the hybrid combustion engine.

According to some embodiments, the controller unit can further determine a combustion phasing based on the combustion pressure data. It can further optimize a combustion timing based on the determined combustion phasing. The optimized combustion timing can improve the efficiency of the hybrid combustion engine.

According to some embodiments, the controller unit can, based on the combustion pressure data, further determine a target crank angular acceleration that maximizes the efficiency of the hybrid combustion engine. Based on the combustion pressure data and the determined target crank angular acceleration, the controller unit can determine a target motor current to maximize the engine's efficiency. At last, the controller unit can adjust the motor current to the target motor current.

Figure 5:
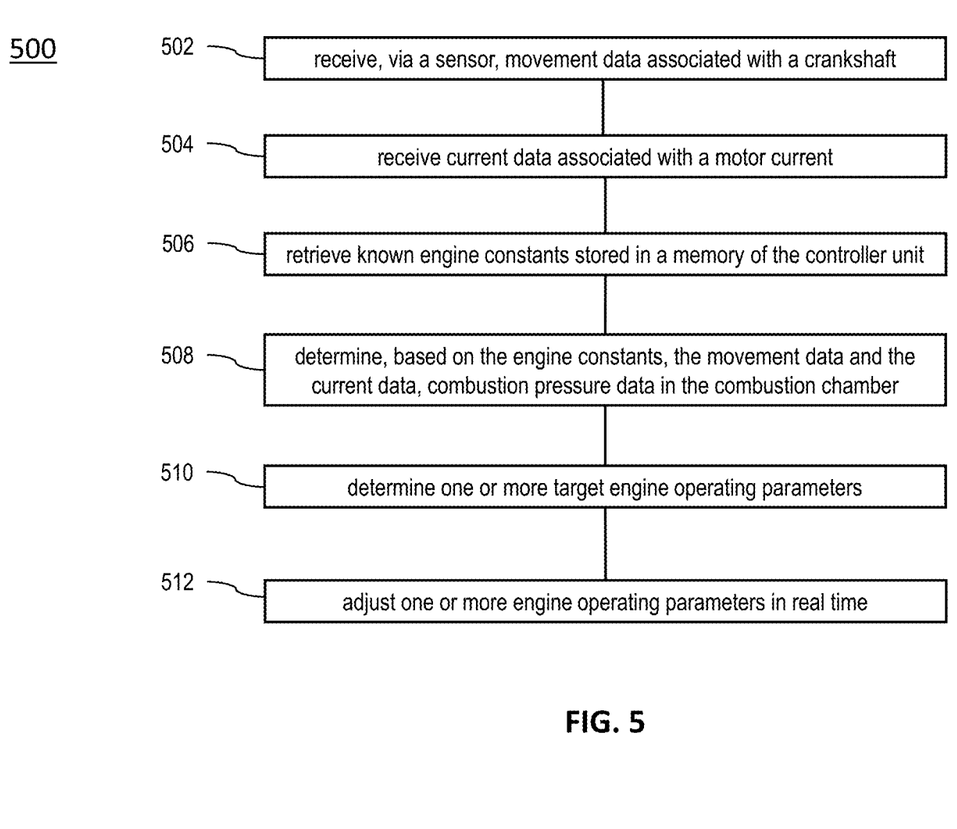
FIG. 5 is another example flow diagram illustrating another embodiment of the present subject matter.

FIG. 5 is another example flow diagram 500, illustrating one embodiment of the present subject matter as it applies to a hybrid Homogeneous Charge Compression Ignition (HCCI) engine. A Homogeneous Charge Compression Ignition (HCCI) is a form of internal combustion in which well-mixed fuel and oxidizer, e.g., air, are compressed to the point of auto-ignition. According to some embodiments, HCCI engines can achieve low levels of nitrogen oxides emissions ($NO_x$) without a catalytic converter.

According to some embodiments, at step 502, a controller unit of a hybrid HCCI engine is configured to receive movement data associated with a crankshaft via a sensor. An example of the controller unit can be an ECU or any computing device that is part of the engine management system. An example of the sensor is a shaft speed sensor or angular position encoder or any crank position sensor that are configured to determine the movement data such as position and/or rotational speed of the crank.

At step 504, the controller unit can simultaneously receive current data associated with a motor current of the electric motor. An electric motor can be a battery motor, a brushless DC motor, a brushed DC motor, or an AC induction motor. According to some embodiments, the current data can be the supply current of the electric motor.

At step 506, the controller unit can retrieve known engine constants from a memory of the controller unit. Examples of the engine constants include, for example, the bore diameter b, crank through r, crank angle $\beta$, the position of piston pin from crank center $\alpha$, the constant of proportionality $K_t$, etc.

At step 508, after retrieving known engine constants, the controller unit can determine instantaneous combustion pressure data based on the engine constants, the movement data and the current data pursuant to the method as disclosed herein. According to some embodiments, the instantaneous combustion pressure data is the actual in-cylinder pressure of the combustion engine.

At step 510, the controller unit can determine, based on the combustion pressure data, one or more target engine operating parameters to maximize the efficiency of the hybrid HCCI engine. According to some embodiments, the one or more target engine operating parameters can be operating parameters an EGR valve position, fuel injected quantity, a valve timing, and an amount of the auxiliary fuel.

At step 512, the controller unit can adjust the engine operating parameters to implement these changes. For example, the controller unit can include closed-loop control of EGR valve position, fuel-injected quantity, cam timing, an amount of the auxiliary fuel (e.g., diesel) in response to the measured combustion pressure.

According to some embodiments, the controller unit can determine, based on the combustion pressure data, a combustion phasing or spark timing of the hybrid opposed piston engine, and optimize a combustion timing based on the determined combustion phasing, wherein the optimized combustion timing is configured to improve the efficiency of the hybrid opposed piston engine.

According to some embodiments, based on the combustion pressure data, the controller unit can determine a target crank angular acceleration that maximizes the efficiency of the hybrid opposed piston engine. The controller unit can further determine a target motor current based on the combustion pressure data and the crank angular acceleration.

Figure 6:
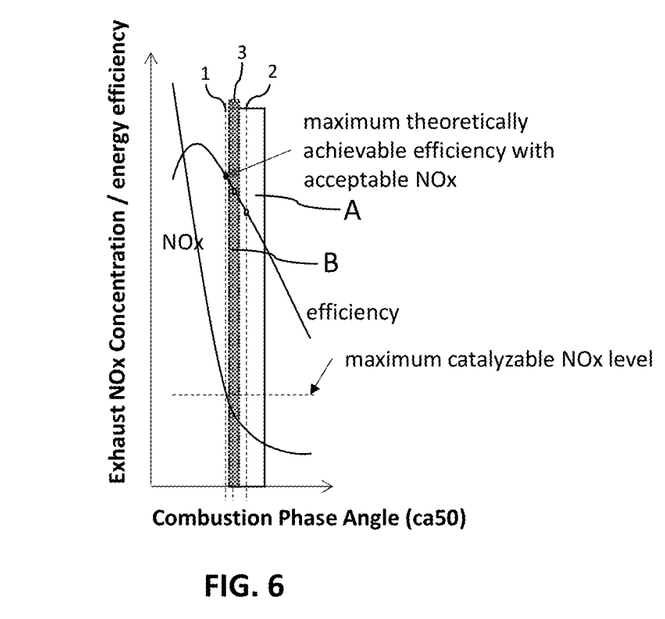
FIG. 6 is an example chart showing one representative application of the present subject matter.

FIG. 6 illustrates an exemplary application of using the combustion pressure data to optimize a hybrid engine's efficiency. According to the present subject matter, a real-time detection of the combustion pressure can be used to improve engine efficiency without accepting higher exhaust emissions.

As shown in FIG. 6, broken line 1 indicates theoretical maximum efficiency phasing for maintaining an acceptable NOx formation level that can be successfully removed by a catalyst, which is only achievable in a laboratory test environment.

Broken line 2 indicates the current state-of-the-art in-vehicle calibration strategy, wherein the combustion phasing is not measured directly but estimated in testing and correlated against spark timing. The phasing or spark timing is intentionally targeted in the lower NOx producing region in anticipation of normal, uncompensated variations in combustion phasing (solid line area A). The present approach can ensure the maximum NOx level is never exceeded. However, it leads to a reduction in engine efficiency.

Broken line 3 shows a calibration method according to the present subject matter, wherein the measured cylinder pressure is available. The present method can facilitate measuring combustion phasing directly, achieve efficiency nearer to the maximum theoretical value due to reduced uncertainty of phasing (gray shaded area B) while simultaneously controlling NOx to a catalyzable level.

As such, by detection of the instantaneous combustion pressure, the controller unit can measure combustion phasing and adjust the calibration strategy accordingly. It can achieve engine efficiency nearer to the maximum theoretical value to reduce the uncertainty of phasing. For example, the controller unit can determine a combustion phasing or spark timing based on the combustion pressure data, and optimize a combustion timing to improve the engine efficiency without increase the NOx pollutants.

Figure 7:
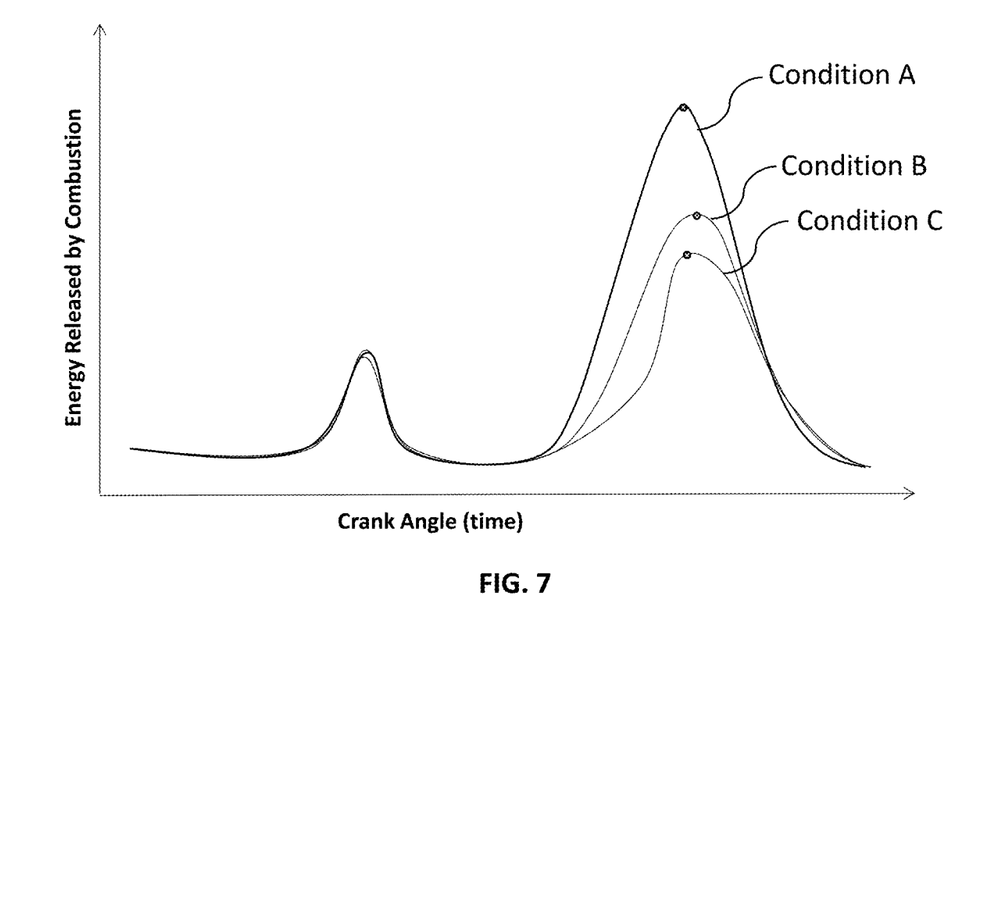
FIG. 7 is another example chart showing another representative application of the present subject matter.

FIG. 7 illustrates another exemplary application of using the combustion pressure data to facilitate alternate low-temperature combustion modes of the engine, such as Homogeneous Charge Compression Ignition (HCCI). As shown in the chart of FIG. 7, the energy release rate of an HCCI engine significantly relies on environmental variables such as fuel chemistry, particularly fuel reactivity, or induction temperature, etc. The output of combustion in an HCCI engine is sensitive to conditions, such as the temperature of the reactants and the precise amount of recirculated exhaust (EGR) present in the mixture before combustion starts.

Furthermore, the rate of combustion affects the maximum combustion pressure. The life span of the engine's mechanical components is determined by the maximum pressure and the rate of pressure (shock) applying to the combustion chamber.

By knowing the combustion pressure, the controller unit can adjust the numerous actuators to compensate for any variations in the HCCI engine's environmental variables as shown in Condition A, Condition B and Condition C, each of which represents a plurality of various environmental variables. For example, the controller unit can implement closed-loop control of EGR valve position, fuel-injected quantity, cam timing, auxiliary fuel (e.g., diesel) delivery system in response to the measured combustion pressure.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

A number of implementations have been described. Nevertheless, it will be understood that various modifications may be made. For example, other steps may be provided, or steps may be eliminated from the described flows, and other components may be added to, or removed from, the described systems. Accordingly, other implementations are within the scope of the following claims.

What is claimed is:

1. A hybrid opposed piston engine, comprising:
   a controller unit;
   a combustion chamber;
   a first crankshaft coupled to a first piston slidably disposed in the combustion chamber;
   a second crankshaft coupled to a second piston slidably disposed in the combustion chamber,
   at least one electric motor configured to at least partially control, via a motor current, at least one of the first crankshaft and the second crankshaft, wherein the controller unit is configured to:
   receive, via a sensor, movement data associated with the at least one of the first crankshaft and the second crankshaft;
   receive current data associated with the motor current; and
   determine, based on the movement data and the current data, combustion pressure data in the combustion chamber.

2. The hybrid opposed piston engine of claim 1, wherein the controller unit is further configured to:
   retrieve one or more known engine constants stored in a memory of the controller unit.

3. The hybrid opposed piston engine of claim 1, wherein the movement data and the current data are continuously received over a cycle of the hybrid opposed piston engine, and the combustion pressure data is continuously determined over a cycle of the hybrid opposed piston engine.

4. The hybrid opposed piston engine of claim 1, wherein the controller unit is further configured to:
   determine, based on the combustion pressure data, a combustion phasing of the hybrid opposed piston engine; and
   optimize a combustion timing based on the determined combustion phasing, wherein the optimized combustion timing is configured to improve the efficiency of the hybrid opposed piston engine.

5. The hybrid opposed piston engine of claim 1, wherein the hybrid opposed piston engine is a Homogeneous Charge Compression Ignition (HCCI) engine, and wherein the controller unit is further configured to:
   determine, based on the combustion pressure data, one or more target engine operating parameters so that the efficiency of the hybrid opposed piston engine is maximized; and
   adjust one or more engine operating parameters in real-time via the controller unit.

6. The hybrid opposed piston engine of claim 5, wherein the one or more engine operating parameters comprise an EGR valve position, a valve timing, and an amount of auxiliary fuel.

7. The hybrid opposed piston engine of claim 1, wherein the controller unit is further configured to:
   determine, based on the combustion pressure data, a target crank angular acceleration that maximizes the efficiency of the hybrid opposed piston engine.

8. The hybrid opposed piston engine of claim 7, wherein the controller unit is further configured to:
   determine, based on the combustion pressure data and the target crank angular acceleration, a target motor current to maximize the efficiency of the hybrid opposed piston engine; and
   adjust the motor current to the target motor current.

9. A hybrid opposed piston engine, comprising:
   a controller unit;
   at least one combustion chamber;
   a first crankshaft coupled to a first piston slidably disposed in the at least one combustion chamber;
   a second crankshaft coupled to a second piston slidably disposed in the at least one combustion chamber,
   at least one electric motor configured to at least partially control, via a motor current, at least one of the first crankshaft and the second crankshaft, wherein the controller unit is configured to:
   receive, via a sensor, movement data associated with the at least one of the first crankshaft and the second crankshaft;
   receiving current data associated with the motor current;
   determine, based on the movement data and the current data, combustion pressure data in the at least one combustion chamber;
   determine a target crank angular acceleration that maximizes the efficiency of the hybrid opposed piston engine;
   determine a target motor current to achieve the target crank speed; and
   adjust the motor current to the target motor current to maximize the efficiency of the hybrid opposed piston engine.

10. The hybrid opposed piston engine of claim 9, wherein the controller unit is further configured to:
    retrieve one or more known engine constants stored in a memory of the controller unit.

11. The hybrid opposed piston engine of claim 9, wherein the movement data and the current data are continuously received over a cycle of the hybrid opposed piston engine, and the combustion pressure data is continuously determined over a cycle of the hybrid opposed piston engine.

12. The hybrid opposed piston engine of claim 9, wherein the controller unit is further configured to:
determine, based on the combustion pressure data, a combustion phasing of the hybrid opposed piston engine; and
optimize a combustion timing based on the determined combustion phasing, wherein the optimized combustion timing is configured to improve the efficiency of the hybrid opposed piston engine.

13. The hybrid opposed piston engine of claim 9, wherein the hybrid opposed piston engine is a Homogeneous Charge Compression Ignition (HCCI) engine, and wherein the controller unit is further configured to:
determine, based on the combustion pressure data, one or more target engine operating parameters so that the efficiency of the hybrid opposed piston engine is maximized; and
adjust one or more engine operating parameters in real-time via the controller unit.

14. A method of detecting combustion pressure data in a hybrid engine, comprising:
receiving, at a sensor, movement data associated with a crankshaft;
transmitting the movement data to a controller unit of the hybrid engine;
receiving current data associated with an electric motor configured to at least partially control the crankshaft;
transmitting the current data to the controller unit;
retrieving one or more known engine constants stored in a memory of the controller unit; and
determining, based on the movement data, current data and the known engine constants, combustion pressure data in a combustion chamber of the hybrid engine.

15. The method of claim 14, further comprising:
determining one or more operational parameters in response to the combustion pressure data to maximize the efficiency of the hybrid internal combustion engine; and
adjusting the at least one or more operational parameters.

16. The method of claim 15, wherein the one or more operational parameters comprises at least one of a recirculated exhaust valve position, an amount of injected fuel, a camshaft timing and an amount of the auxiliary fuel.

17. The method of claim 14, wherein the movement data and the current data are continuously received over a cycle of the hybrid engine, and the combustion pressure data is continuously determined over a cycle of the hybrid engine.

18. The method of claim 14, further comprising:
determining, based on the combustion pressure data, a combustion phasing of the hybrid engine; and
optimizing a combustion timing based on the determined combustion phasing, wherein the optimized combustion timing is configured to improve the efficiency of the hybrid engine.

19. The method of claim 14, wherein the hybrid engine is a Homogeneous Charge Compression Ignition (HCCI) engine, and wherein the controller unit is further configured to:
determine, based on the combustion pressure data, one or more target engine operating parameters so that the efficiency of the hybrid engine is maximized; and
adjust one or more engine operating parameters in real-time via the controller unit.

20. The method of claim 19, wherein the one or more engine operating parameters comprise an EGR valve position, a valve timing, and an amount of auxiliary fuel.

* * * * *